E. H. BOUDWIN.
SIGNALING SYSTEM FOR RAILWAY TRAINS.
APPLICATION FILED FEB. 24, 1912.
1,148,142.
Patented July 27, 1915.
2 SHEETS—SHEET 1.
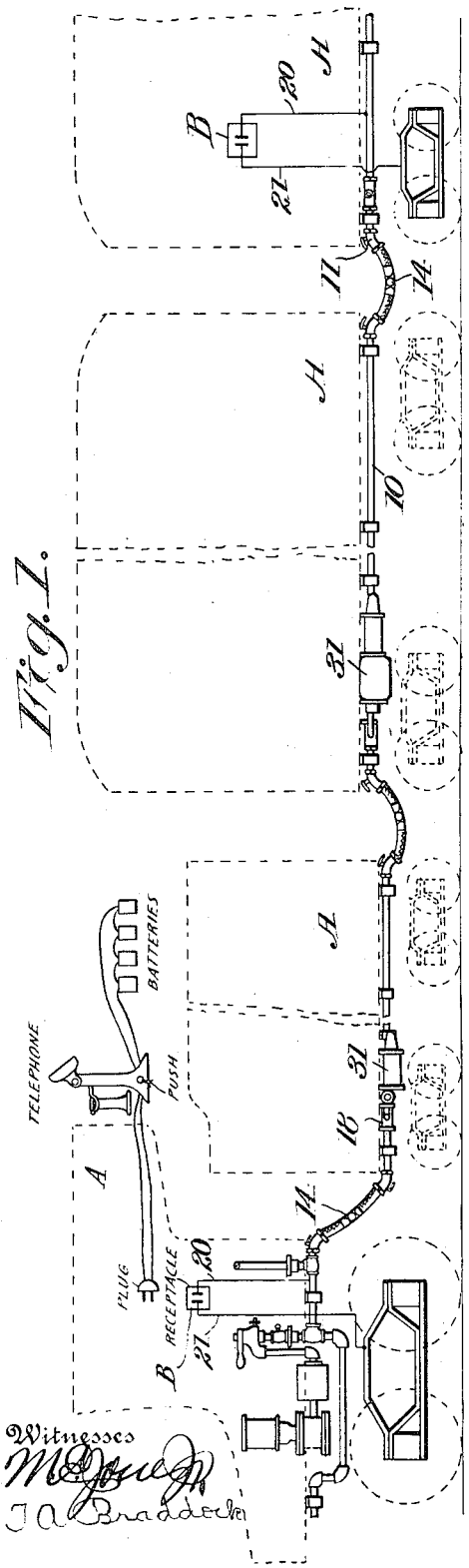
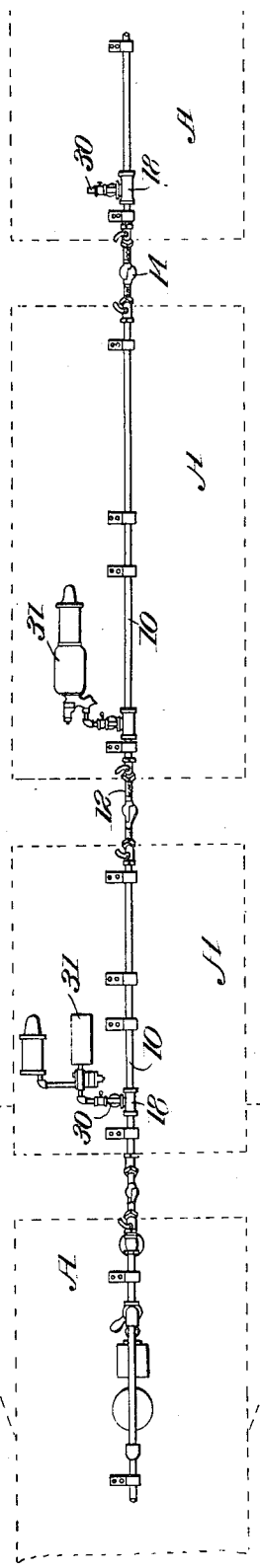

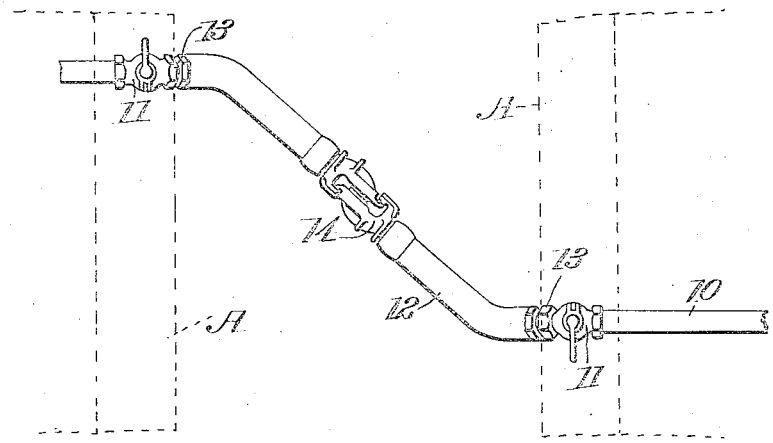
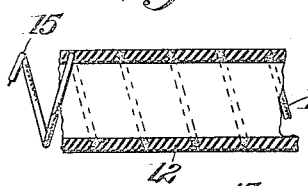
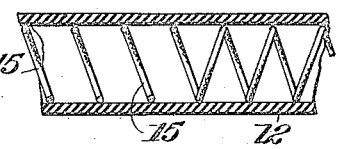
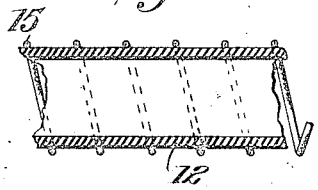
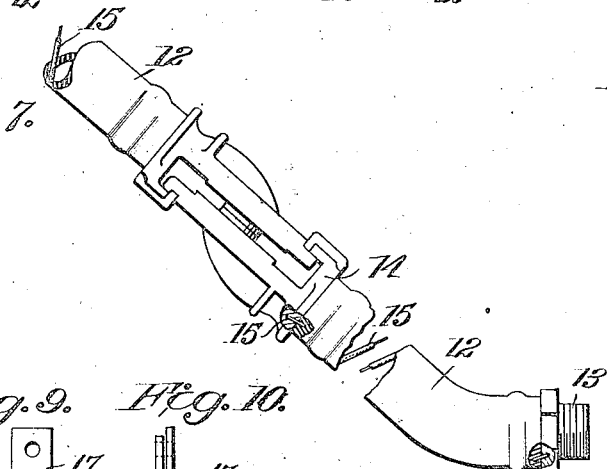
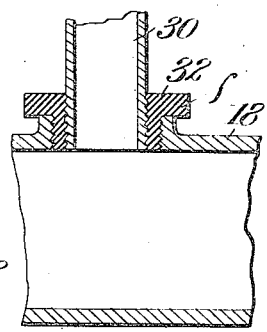
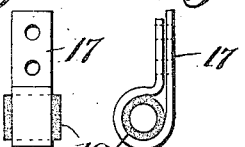

UNITED STATES PATENT OFFICE.

EDWARD H. BOUDWIN, OF PHILADELPHIA, PENNSYLVANIA, ASSIGNOR OF ONE-SIXTH TO DANIEL W. HARNER, ONE-SIXTH TO ROBERT L. WORSING, ONE-SIXTH TO CARL M. GAGE, AND ONE-SIXTH TO JAMES A. PFOUTS, ALL OF PHILADELPHIA, PENNSYLVANIA, AND ONE-SIXTH TO AMBROSE E. YOHN, OF HUNTINGDON, PENNSYLVANIA.

SIGNALING SYSTEM FOR RAILWAY-TRAINS.

1,148,142.           Specification of Letters Patent.      Patented July 27, 1915.

Application filed February 24, 1912. Serial No. 679,732.

*To all whom it may concern:*

Be it known that I, EDWARD H. BOUDWIN, a citizen of the United States, residing at Philadelphia, Philadelphia county, and State of Pennsylvania, have invented and discovered certain new and useful Improvements in Signaling Systems for Railway-Trains, of which the following is a specification.

My said invention consists in a further development of and certain modification in the construction and arrangement of parts of a telephone system for railway trains, of the same general character as that forming the subject matter of my application #662,722, filed November 27, 1911, whereby the apparatus is simplified and various advantages secured, all as will be hereinafter more fully described and claimed.

Referring to the accompanying drawings which are made a part hereof and on which similar reference characters indicate similar parts, Figure 1 is a diagrammatic view showing my invention as applied in the train, Fig. 2 an underside plan view of the same, Fig. 3 a detailed view showing the connection between two component parts of a train, Fig. 4 a detailed view on an enlarged scale showing a portion of the flexible section of the air-hose, or " train line." of the approved form, Figs. 5 and 6 detailed views showing modified forms, and, Figs. 7, 8, 9, and 10, detailed views of several parts on an enlarged scale.

In said drawings the portions marked A represent the different portions of the train such as the cars, locomotive, tender, etc., and B, telephones located in different parts of the train.

The train is equipped with an air pipe line 10, which is usually carried on the frame of the cars, as may be most convenient according to the style of car with which it is employed. Each car carries a section fitted with an ordinary or any approved form of angle cock 11 on each end. Flexible hose sections 12 connect the line from car to car as usual. Each section of hose 12 is provided with a hose nipple 13 on one end and a hose coupling 14 on the other. These several parts are all, in the main, of an ordinary or approved form. The pipe sections are mounted on the train with hangers or supports 17, or such as commonly employed or may be found appropriate. The train line, however, is insulated from the other parts, such as the pump, reservoir, and air controller. This insulation is of any preferred form, a fibre, or other insulating bushing 16 mounted around the pipe 10 within the hangers 17 being suitable for the purpose. T's 18 are mounted in the line for the connection of branches 30 leading to the reservoir 31, pump, etc. A bushing 32 of insulating material, such as mica compound, is formed with interior and exterior screw-threads, being screwed into the screw-threaded openings in T 18 and pipe 31 being screwed into the interior thereof. Said bushing is formed with an annular flange *f* which extends beyond the boss on T 18 through which the perforation is formed to guard against "bridging" around the insulation by water, etc. By this means the train line is entirely insulated from the other parts of the car from end to end of the train. Each hose section 12 has a conductor, such as a wire 15, either embedded in its wall, as shown in Fig. 4, inclosed within the hose as shown in Fig. 5, or surrounding the hose as shown in Fig. 6. In either case the ends of the conductor are respectively connected to the hose coupling 14 at one end and the hose nipple 13 at the other, so that when the hose coupling is connected a metallic circuit is established from end to end of the train.

Telephone B, including battery and other necessary parts, may be located in the locomotive and at other points throughout the train, wherever desired, and connected by a wire 20 with the train line and another wire 21 to some metallic base that is in good metallic communication with the rails, thus establishing a complete electrical circuit, one side of which is, in the main, the train line and the other side of which is the rail, thus avoiding the use of wiring entirely except through flexible hose sections and from the telephones, as indicated.

While I have shown the wire in Figs. 4, 5, and 6 as spirally arranged it will be understood, of course, that it may be run through the hose in a straight, or any other direction, preferred. The spiral form is considered more durable and less liable to become broken and for this reason is shown as the preferred form. Other modifications in details may be made without departing from my said invention.

Having thus fully described my said invention, what I claim as new, and desire to secure by Letters Patent is:

1. A telephone system for railway trains consisting of a telephone in each component part of the train, a train-line extending throughout the length of each component part of the train and insulated from metallic contact with its supports, couplings connecting said train-line from one component part of the train to the other carrying metallic connections for completing a metallic conductor throughout the entire length of the train, a wire connecting one side of each of said telephones to said train-line, a second wire for grounding the other side of each of said telephones, a battery in the circuit, and signaling means, whereby communication may be had between any component part of the train and any other component part of the train, substantially as set forth.

2. A telephone system for railway trains comprising telephones located throughout the train, a metallic circuit, one side of which is the train line and the other side of which is the track, means for supporting said train line and connecting it with the air system including insulation between said train line and said means, and metallic connections between the different sections of the train line connected with the ordinary couplings thereof, substantially as set forth.

3. A telephone system for railway trains comprising the train line extending from end to end of each component part of the train and insulated from metallic contact therewith, couplings for connecting the train line of one component part with the train line of adjacent component parts, a telephone located in each component part of the train, a wire connecting each of said telephones with its respective section of train line, a second wire for grounding the other terminal of each telephone, a battery located in one of the component parts of the train and connected in the circuit, and appropriate switches, whereby any number of sections may be added to or disconnected from the train without interfering with said telephone system, substantially as set forth.

4. A telephone system for railway trains comprising telephones located in different parts of the train, a train line connecting from the point where one telephone is located to a point where another telephone is located, metallic connections from end to end of said train line, supports for said train line insulated therefrom, a conductor connecting one side of the telephones with said train line, and another conductor connecting the other side of the telephones with a part in metallic communication with the track, substantially as set forth.

In witness whereof, I have hereunto set my hand and seal at Washington, District of Columbia, this twenty second day of February, A. D. nineteen hundred and twelve

EDWARD H. BOUDWIN. [L. S.]

Witnesses:
E. W. BRADFORD,
FRANK FULLER.